United States Patent [19]

Lawrence

[11] Patent Number: 5,056,303
[45] Date of Patent: Oct. 15, 1991

[54] PEA HARVESTER HEAD

[75] Inventor: Terence M. Lawrence, Fakenham, England

[73] Assignee: FMC Corporation, Chicago, Ill.

[21] Appl. No.: 501,462

[22] Filed: Mar. 30, 1990

[51] Int. Cl.$^5$ ............................................. A01D 45/24
[52] U.S. Cl. .................................... 56/14.5; 56/327.1; 460/16
[58] Field of Search ............. 56/327.1, 16.4, 14.5, 56/14.6, DIG. 5, 153; 460/16, 20, 70

[56] References Cited

U.S. PATENT DOCUMENTS

| | | | |
|---|---|---|---|
| 3,492,798 | 2/1970 | Hart | 56/14.5 |
| 4,199,923 | 4/1980 | Blake | 56/14.5 |
| 4,229,932 | 10/1980 | Persoons et al. | 460/16 |

Primary Examiner—Terry L. Melius
Attorney, Agent, or Firm—Douglas W. Rudy; Richard B. Megley

[57] ABSTRACT

A legume harvester head assembly transports legume pods and a certain amount of vine mass delivered by a picking reel to a main apron immediately adjacent to the picking reel. The main apron moves the pods and the vine mass away from the picking reel toward a pair of vertically arranged gathering conveyors being driven and moving in a direction toward a discharge point. Pods and vine mass is deposited on an elevator conveyor from an opening between the two gathering conveyors.

12 Claims, 4 Drawing Sheets

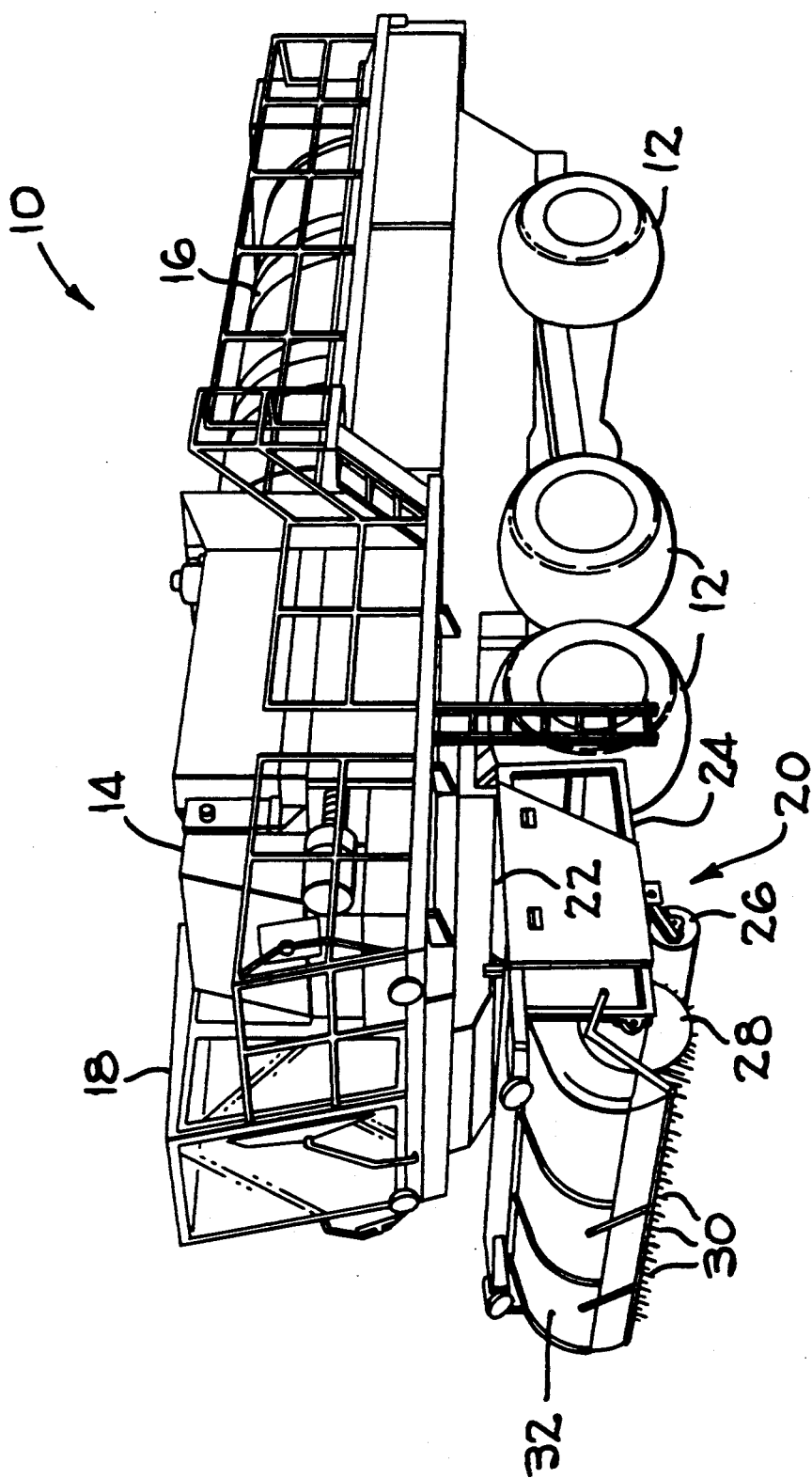
FIG_1

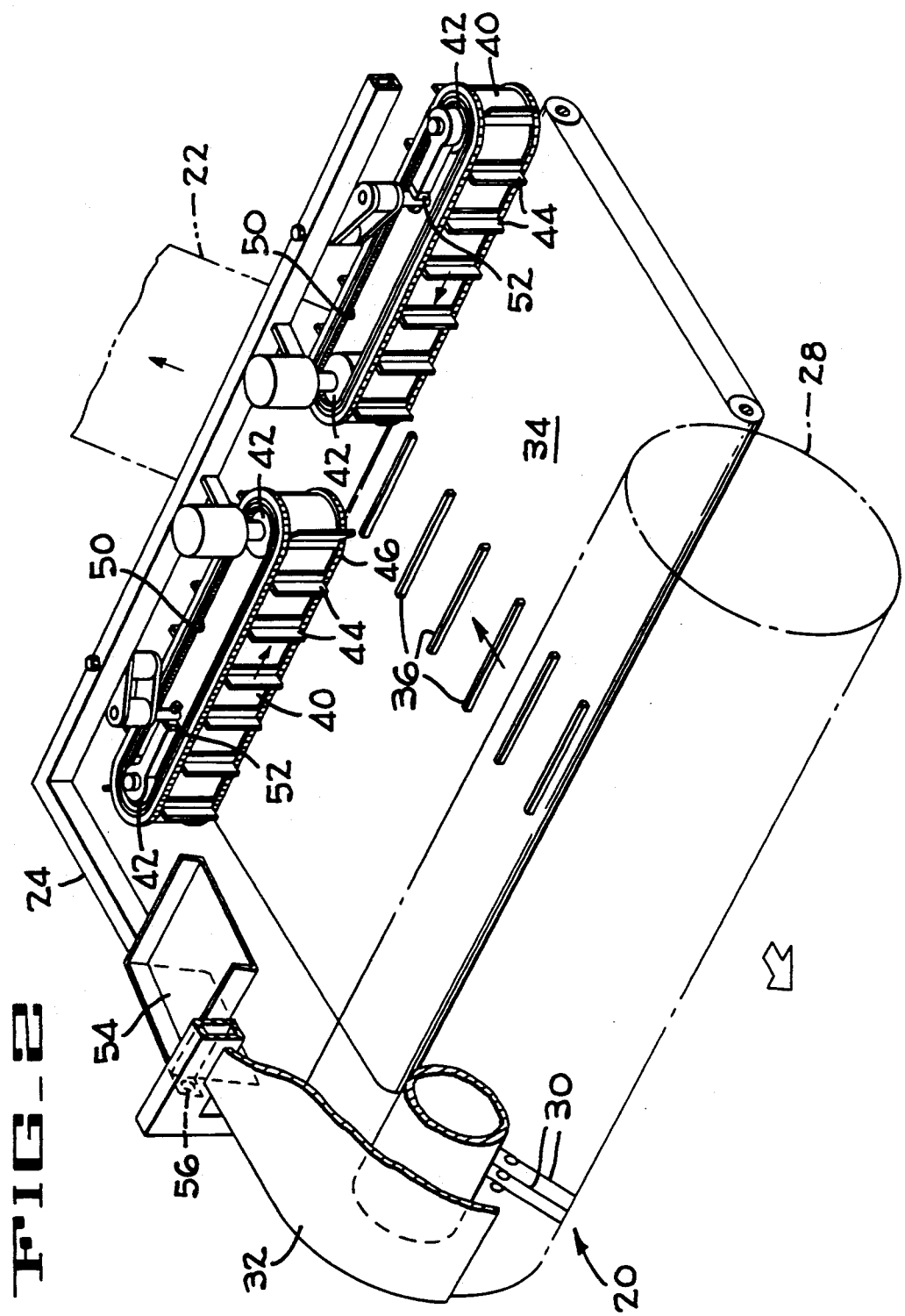
FIG_2

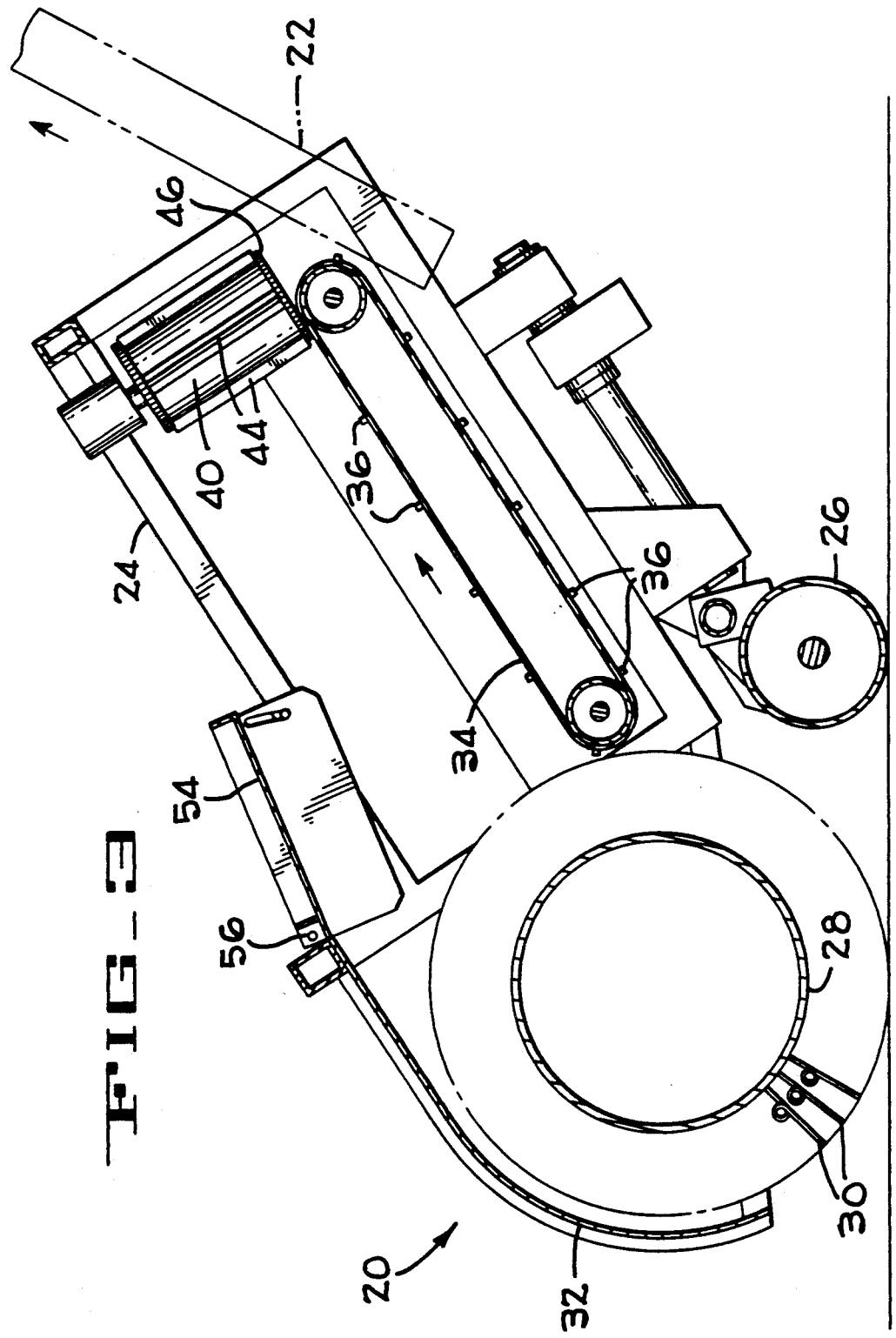

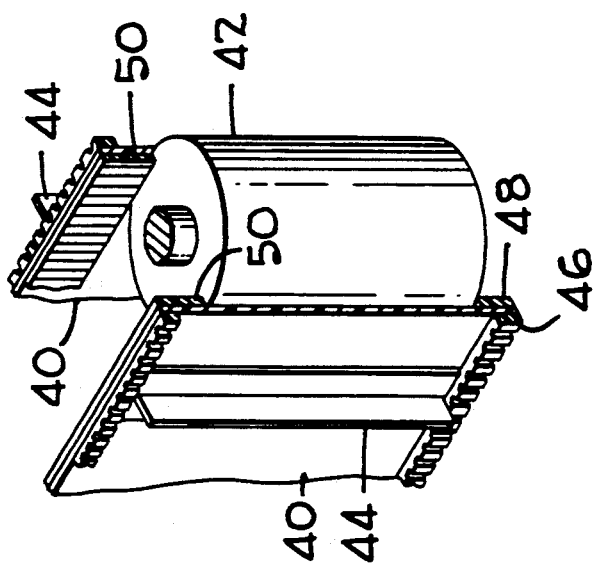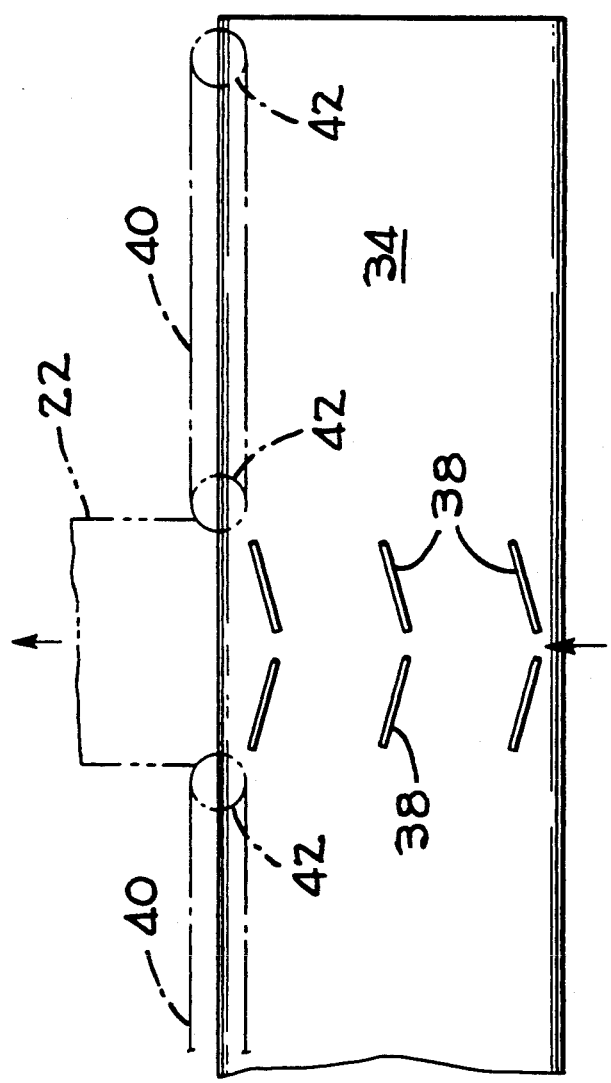

PEA HARVESTER HEAD

BACKGROUND OF THE INVENTION

This invention has to do with header units carried on legume harvesters designed for the picking and shelling of peas or other similar fresh legumes. For this specification the picking of peas will be discussed although it is expected that this invention could find equal utility in picking broad beans and lima beans.

Pea pods are harvested by means of a wide header passing over and through a stand of vines. The vines are stripped of the pea pods by a picking reel which is a rotating drum having spring mounted fingers extending outwardly from its surface. The picked pea pods are directed over the picking reel through a chute formed between the picking reel and a cover over the reel. The pods and some vegetation mass is deposited on a main apron which, with the assistance of guides to be discussed further on, direct the pods and vegetation mass to an elevator conveyor which takes the pea pods and the vegetation mass into the combine section of the pea harvester.

A highly successful contemporary pea harvester uses a plurality of augers in place of the main apron mentioned above. In this prior art embodiment the picking reel flings the picked pods and a certain amount of vegetative matter onto the augers from above them. Two sets of augers are used. Each set of two augers are driven independently toward each other so that "hulme", a term used to describe the mass of pea pods and vegetative matter, deposited thereon is directed inwardly from the outboard ends of the picking reel to the central area of the header, that is, close to the medial center line of the machine. The two sets of augers then deposit the hulme onto the elevator conveyor for transport to the combine section of the pea harvester.

In another prior art embodiment the augers have been replaced by conveyor belts that direct the discharge from the main apron onto transverse conveyor belts independently driven toward each other and directed to the elevator.

It is also known that there exists a broad bean harvester specially designed by the assignee of this invention that incorporates a reel for picking up a windrow of broad bean vines at a gentle and slow rate. The windrowed hulme is deposited on a main apron which delivers the windrowed hulme directly to an elevator conveyor. The main apron is horizontally disposed tangentially to the reel above the centerline thereof. A pair of compacting conveyors are arranged vertically above the main apron and driven toward each other but spaced apart to provide an opening where the windrow is slightly compacted, that is, the sides of the windrow are directed somewhat inwardly such that it is not too wide to fit onto the elevator conveyor.

The present invention has the advantage of eliminating the augers and the transverse belts and improving the flow of the hulme through the head of the pea harvester. The "flow" of the hulme is the movement of the mass of pods and vegetative material. With the earlier transverse belt system, and with the auger system as well, the hulme had to make two consecutive right angle turns between the main apron and the elevator belt. These turns hamper the speed of the hulme travel through the header and thus limit the speed of the harvester through the crop.

SUMMARY OF THE INVENTION

The invention presented herein is the collection system for use on a pea harvester header. The usual picking head is improved by the incorporation of a "main apron" and a pair of "gathering conveyor belts". The main apron is a wide conveyor running from a picking reel to an elevator. The gathering conveyor belts are carried above the main apron and run toward each other to an opening between the gathering conveyor belts generally in line with the elevator.

The gathering conveyors urge the full width of hulme on the main apron to be gently compacted as the hulme is fed by the main apron toward the elevator.

One advantage of this system of a main apron and the gathering conveyor is that the hulme is gently "flowed" in a smooth path to the elevator. No sudden direction changes are experienced by the hulme as in other prior art embodiments.

Another advantage of this invention is that the pea pods are handled more gently, thus preventing damage to the product, while allowing a quicker speed of the hulme from the picking reel to the elevator.

BRIEF DESCRIPTION OF THE DRAWING FIGURES

The following specification, when read in conjunction with a perview of the attached drawings, will provide the reader with a full understanding of this invention. In the drawings:

FIG. 1 is a pea harvester which includes a head incorporating the invention;

FIG. 2 is a projection view with some parts removed and others broken away for clarity;

FIG. 3 is a cross sectioned side elevation view of the head;

FIG. 4 is a projection view of a portion of a gathering conveyor with some parts sectioned;

FIG. 5 is a top view of a portion of the head.

DETAILED DESCRIPTION OF THE INVENTION

The general environment of the invention is shown in FIG. 1 wherein a pea harvester, generally 10 is shown.

In this Figure, and in other Figures where like reference numerals refer to like parts, the pea harvester vehicle includes a set of wheels such as 12 supporting the main chassis 14 which includes the combine drum section 16, the cab section 18 and the picking head generally 20 product, such as fresh peas in this case for example, are picked by the picking head generally 20 and sent via elevator 22 to the combine drum section wherein the peas are separated from the vegetative matter in a conventional manner.

FIG. 3, the side elevation view of the picking head area of the pea harvester, and FIG. 2 which is an orthographic projection of the picking head, show the invention in some detail. In these figures the picking head 20 is arranged in front of a conventional elevator represented by the broken line box 22. A free floating frame 24, one that is free to move within reasonable restraints, both vertically and around a central longitudinal pivot point, is supported by a ground support roller 26. A conventional picking reel 28, having spring mounted tines 30, will rotate clockwise and capture and carry hulme to the main apron 34. A reel cover 32 prevents the hulme from being prematurely ejected from the picking reel until the desired point of reel rotation. The vines, pea pods, and other vegetative matter will be flung off the tines and deposited on the main apron 34 which is traveling in the direction of the arrow in FIGS. 2 and 3. The hulme, assisted by flights such as 36 will be directed toward the elevator 22.

Gathering conveyor belts such as 40, both operating in the direction of the arrows shown in FIG. 2, will intercept any hulme outboard of the central zone of the main apron 34 and direct such hulme to the central zone of the main apron such that the hulme is directed into the elevator. In this Figure, as well as in FIG. 3, it can be seen that the gathering conveyor belts 40 are carried such that they are substantially perpendicular to the main plane of the main apron and run perpendicular to the running direction, as indicated by the arrows in FIG. 2, of the main apron.

The gathering conveyors are similar for the left and right side locations as can be seen. Each gathering conveyor belt 40 is driven by a conveyor support roller 42 which would be, for example, an electric or a hydraulic motor driven roller in contact with the inside surface of the gathering conveyor belts. On the obverse side of the gathering conveyor belts, i.e., the hulme contacting side, a plurality of vertical flights such as 44 are fastened, bonded or otherwise attached to the belts. These flights 44, or paddles, assist in urging the hulme toward the center of the main apron 34.

As can be more clearly seen in FIG. 4, the bottom portion or lower edge of the belt is equipped with a traction zone 46 which assists in urging the hulme to travel to the center of the main apron. On the other side of the gathering conveyor belt 40, in the area of the traction zone 46 at the "bottom" of the belt is a lower inner guide strip 48 which is bonded to or formed with the gathering conveyor belt to assist in maintaining the belt tracking properly around the conveyor support roller 42. An upper inner guide strip 50 is also formed, bonded or otherwise fastened to the inside of the gathering conveyor belt at or proximate to the "top" of the gathering conveyor belt—again to assist in maintaining the belt tracking properly around the conveyor support roller 42.

A tensioning device, such as the screw tensioner 52 provide the support for an undriven conveyor support roller. The tensioning device will assist in maintaining belt tension of the gathering conveyor belts 40.

As mentioned above the flights 36 on the main apron are provided to assist in feeding the hulme to the elevator. They provide a more positive interference with the hulme and tend to speed the hulme faster in the center of the main apron. A variation of these flights is shown in FIG. 5 wherein an alternative flight configuration uses angled flights 38 in place of the straight flights 38. The slight angle of the flights to the normal direction of travel of the main apron has been shown to have a somewhat improved ability to move the hulme to the elevator.

Not mentioned earlier is the provision of an adjustable deflector 54, pivoted at a hinge point 56 at the egress area of the reel cover 32. The deflector can be adjusted to direct the hulme to a higher or lower position on the main apron. It has been found that different crops respond differently to their landing zone on the main apron. The adjustable deflector 54 allows the crop to be directed to the most optimal position.

The operation of a conventional picking head is well understood by those having skill in the art therefore only comments directed to the invention are provided here. Keep in mind that this picking head and the invention are designed for full width swathe cuts rather than the picking up of windrowed hulme. A full width of product or hulme is directed to the main apron by the reel cover 32, tines 30 and adjustable deflector 52. The main apron 34 moves the hulme in the direction of the solid headed arrow (in FIG. 2) toward the gathering conveyor belts 40. Upon impingement with these belts the hulme is directed inwardly toward the center of the main apron 34 and ultimately to the elevator 22. As hulme builds up in bulk on the main apron a sort of "rolling" motion is imparted to the hulme by the direction vectors of the main apron and the gathering conveyor belts. This tends to predispose the hulme to gently feed at a relatively gradual progression toward the opening between the two gathering conveyors. The result is more gentle handling of the hulme than was experienced with the screw conveyor prior art types of devices familiar in the pea harvesting arena.

An experienced pea harvester operator will recognize the benefits of this invention and may propose nuances of design that would improve upon the concepts and invention presented here. Such nuances of design are contemplated as being within the scope of the following claims wherein:

What is claimed is:

1. In a harvester for harvesting legume pods, a header having a picking reel and an elevator conveyor, the improvement comprising:

a main apron substantially horizontally disposed adjacent said picking reel for receiving said pods picked by said picking reel;

a pair of gathering conveyor belts carried above said main apron and generally perpendicular relative to said main apron for urging said pods to said elevator conveyor, said gathering conveyor belts running perpendicular to the running direction of said main apron.

2. The invention in accordance with claim 1 wherein each of said gathering conveyor belts is a continuous belt trained around a drive inducing means and an idler means.

3. The invention in accordance with claim 2 wherein said idler means is an undriven idler roll.

4. The invention in accordance with claim 3 wherein said idler means is a pair of idler rollers.

5. The invention in accordance with claim 2 wherein each of said gathering conveyor belts includes a plurality of flights attached thereto.

6. The invention in accordance with claim 5 wherein said flights are disposed generally vertically across the height of said gathering conveyor.

7. The invention in accordance with claim 2 wherein said gathering conveyor includes a traction zone and an impact zone, said impact zone vertically above said traction zone.

8. The invention in accordance with claim 5 wherein said gathering conveyor includes a traction zone and an impact zone, said impact zone vertically above said traction zone.

9. The invention in accordance with claim 1 wherein said main apron is a continuous conveyor trained around a drive means and an idler roll means.

10. The invention in accordance with claim 9 wherein said main apron is provided With pusher flights in a zone of said main apron aligned with said elevator.

11. The invention in accordance with claim 10 wherein said pusher flights are mounted to said main apron at an angle greater than perpendicular to the normal direction of travel of said main apron.

12. The invention in accordance with claim 10 wherein a plurality of said pusher flights are mounted to said main apron at an angle less than perpendicular to the normal direction of travel of said main apron.

* * * * *